3,775,320
ORGANIC COMPOSITIONS CONTAINING SALTS OF AMINES AND SUBSTITUTED ACETIC ACIDS AS CORROSION INHIBITORS

Mario Vigo, Portici, Italy, and Fritz A. Buehler, Cherry Hill, N.J., assignors to Mobil Oil Corporation
No Drawing. Filed Oct. 5, 1971, Ser. No. 186,818
Int. Cl. C10m 1/48
U.S. Cl. 252—33.6           7 Claims

ABSTRACT OF THE DISCLOSURE

Organic compositions are provided containing, as a corrosion inhibitor, salts obtained by reacting an imidazoline or a diamine with an alpha-substituted acetic acid.

(1) Field of the invention

This invention relates to improved organic compositions and, in one of its aspects, relates more particularly to improved organic compositions comprising an organic base medium susceptible of permitting corrosive deterioration of metal surfaces under conditions of use.

(2) Description of the prior art

It is well known to those skilled in the art that organic compositions containing organic base media, for example oils of lubricating viscosity, greases, fuels, solvents and other types of liquid hydrocarbon-containing compositions are susceptible of permitting corrosive deterioration of surfaces with which they come into contact, for example, oils employed as lubricants in internal composition engines, or as lubricants for various types of mechanical elements in which lubricants are employed, such as gear oils, cutting oils and other forms of lubricants. It is also well known that other organic media such as grease formulations, hydrocarbon fuels, for example gasoline, diesel fuel, turbine fuels and hydrocarbon solvents are also capable of permitting undesirable corrosive deterioration. In this respect, various types of corrosion inhibitors have been suggested to reduce or prevent undesirable corrosive deterioration. However, the incorporation of such inhibitors has nevertheless still left a need for a more effective corrosion-inhibiting effect, particularly with respect to the use of more sophisticated present-day organic compositions of the type hereinbefore disclosed.

SUMMARY OF THE INVENTION

In accordance with the present invention, improved organic compositions comprising a major proportion of organic base media, which would normally be susceptible of permitting corrosive deterioration, are provided in which these compositions contain a minor proportion, sufficient to inhibit such deterioration, of a salt obtained by reacting an imidazoline or a diamine with an alpha-substituted acetic acid having the formula:

$$R_1XCH_2COOH$$

wherein X is oxygen, sulfur or the amino group $NR_2$; $R_1$ is alkyl, aryl, alkaryl, aralkyl or hydrogen, and when X is $NR_2$, $R_1$ is an acyl or substituted acyl group and $R_2$ is alkyl, aryl, alkaryl, aralkyl or hydrogen.

Any imidazoline or diamine may be employed for reaction with the alpha-substituted acetic acid to form the corrosion-inhibiting salt. Exemplary of the imidazoline reactant are such imidazolines as dodecenyl imidazoline and heptadecenyl imidazoline. Exemplary of the diamine reactant are such diamines as 3-aminomethyl-3,5,5-trimethylcyclohexylamine, N-hepta-decyl-1,3 - propane-diamine, ethylene diamine and hexylene diamine. Any alpha-substituted acetic acid having the above-described structure, may be employed for reaction with the imidazoline or diamine reactants. Exemplary of such substituted acetic acids are n-octylthioacetic acid, nonyl-phenoxy-acetic acid and oleoyl-sarcosine. Reaction between the aforementioned components may be carried out at room temperature or elevated temperature as so desired.

Insofar as the specific reactants for forming the desired salt corrosion inhibiting additive are concerned, the aforementioned reactants may be employed in stoichiometric proportions. In general, the imidazoline or the diamine are reacted with the acid in an equivalent weight ratio of from about 30:1 to about 0.1:1, and, preferably, in an equivalent weight ratio of from about 15:1 to about 0.3:1. Insofar as the quantity of salt incorporated in the organic base medium is concerned, any amount, in minor proportion, which is sufficient to impart the desired degree of anti-corrosion effect, may be employed. In general, the salt is employed in an amount from about 0.001 to about 10%, and preferably in an amount from about 0.1 to about 5%, by weight, of the total weight of the organic composition.

The salt may be separately preformed and thereafter incorporated in the organic base medium, or it may be formed in situ by individually incorporating the aforementioned reactants in the base medium, if so desired.

As more fully hereinafter illustrated by comparative data, it has been found that unexpected and significantly higher degrees of corrosion-inhibiting effects are realized by employing, as the corrosion inhibitor, the aforementioned reaction product of the imidazoline or diamine with the alpha-substituted acetic acid, than is obtained employing the same quantity of each reactant, individually. In essence, a synergistic effect can be seen to exist by reacting the imidazoline or diamine with the acid, rather than employing the aforementioned reactants, individually, as corrosion inhibitors, even though the same quantity of inhibitor is employed in each instance.

DESCRIPTION OF SPECIFIC EMBODIMENTS

The following examples and comparative data will serve to illustrate the novel organic compositions of the present invention and the significant corrosion-inhibiting effect obtained by incorporating the above-described salts therein, in combination with organic base media.

In accordance with the data set forth in the following table, the lithium-hydroxy-stearate base grease, employed, comprised a solvent refined, naphthenic mineral oil of 56 SUS viscosity at 210° F., thickened with 15 wt. percent lithium hydroxy-stearate soap and 0.5 wt. percent antioxidant to a smooth grease of an unworked penetration of 220, and a 60 stroke worked peneration of 228.

The calcium-acetate complex base grease comprised a solvent refined, naphthenic mineral oil of 70 SUS viscosity at 210° F., thickened by a calcium-acetate complex thickener (as shown in U.S. Pat. No. 2,898,297, Example 6) and 0.5 wt. percent antioxidant into a smooth grease with an unworked penetration of 246 and a 60 stroke worked penetration of 248.

The modified clay base grease comprised a paraffinic mineral oil of 62 SUS viscosity at 210° F. thickened by 11 wt. percent oleo-philic clay thickener (as shown in U.S. Pat. No. 2,531,440, Example 4), and 0.5 wt. percent anti-oxidant to a smooth grease of an unworked penetration of 245 and a 60 stroke worked penetration of 265.

All grease samples, with or without added rust inhibitors, were mixed on a hot plate at 250° F. surface temperature, homogenized in a 3-roll ink mill and subjected to the standard test for determining corrosion, Rust Preventive Properties of Lubricating Greases ASTM Method D-1743.

The Brine Panel Test comprised coating the freshly ground surface of a cold-rolled steel panel with a grease sample containing aqueous brine solution (1 part brine solution containing 25 wt. percent sodium chloride in water, emulsified into 4 parts grease sample). After storing the coated panel for three weeks at 130° F. and 100% relative humidity, it is wiped free of grease coating and the corrosion staining of the panel surface rated. The rating *None* means free of any stain; the rating *Heavy* means corrosion stain covers the entire surface. *Trace, Light* and *Medium* are intermediate ratings.

diamine and hexylene diamine with an alpha-substituted acetic acid having the formula:

$$R_1XCH_2COOH$$

wherein X is oxygen or sulfur and $R_1$ is alkyl, aryl, alkaryl, aralkyl or hydrogen.

2. A composition as defined in claim 1 wherein said salt is present in an amount from about 0.001 to about 10%, by weight.

TABLE

| Example | Base | Wt. percent | Acid | Wt. percent | Grease | Wt. percent | Corrosion tests ASTM D1743 rating | Brine panel rating |
|---|---|---|---|---|---|---|---|---|
| 1 | Heptadecenyl imidazoline | 0 | Nonyl-phenoxy-acetic acid | 0 | Lithium hydroxy-stearate | 100 | 3, 3, 3 | Heavy. |
| 2 | do | 1.0 | do | 0 | do | 99 | 1, 1, 1 | Light-medium. |
| 3 | do | 0 | do | 1.0 | do | 99 | 1, 1, 1 | Light. |
| 4 | do | 0.5 | do | 0.5 | do | 99 | 1, 1, 1 | Trace. |
| 5 | do | 0 | do | 0 | Calcium acetate complex | 100 | 3, 3, 3 | Heavy. |
| 6 | do | 1.0 | do | 0 | do | 99 | 1, 1, 1 | Light. |
| 7 | do | 0 | do | 1.0 | do | 99 | 1, 1, 1 | Do. |
| 8 | do | 0.5 | do | 0.5 | do | 99 | 1, 1, 1 | None. |
| 9 | N-hepta-decyl-1,3-propane-diamine | 0 | Oleoyl-sarcosine | 0 | Lithium hydroxy-stearate | 100 | 3, 3, 3 | Heavy. |
| 10 | do | 1.0 | do | 0 | do | 99 | 1, 1, 2 | Light. |
| 11 | do | 0 | do | 1.0 | do | 99 | 1, 1, 2 | Medium. |
| 12 | do | 0.5 | do | 0.5 | do | 99 | 1, 1, 1 | Trace. |
| 13 | 3-amino-methyl-3,5,5-trimethyl-cyclohexyl-amine | 0 | Nonyl-phenoxy-acetic acid | 0 | Modified clay | 100 | 3, 3, 3 | Medium. |
| 14 | do | 1.0 | do | 0 | do | 99 | 1, 1, 1 | Light. |
| 15 | do | 0 | do | 1.0 | do | 99 | 3, 3, 3 | Trace. |
| 16 | do | 0.5 | do | 0.5 | do | 99 | 1, 1, 1 | Do. |

As will be seen from the data of the foregoing table, a marked improvement, in synergistic effect, with respect to corrosion inhibition is realized by employing the combination of imidazoline or diamine with the alpha-substituted acetic acid in forming the aforementioned salt product, than is obtained by employing each reactant individually, although in a similar amount as that of the salt. This effect will be apparent from the results set forth in Examples 4, 8, 12 and 16 of the table.

It will be understood that the improved organic compositions of the present invention may, if so desired, contain various other additives or mixtures of such additional additives in order to further enhance their properties. Thus, the organic compositions of the present invention may contain such additives as extreme pressure agents, antioxidants, antifoamants, detergents, dispersants and the like. In addition, various other imidazolines, diamines or alpha-substituted acetic acids may be employed in place of those hereinbefore described for purposes of illustration. It will also be understood that although the present invention has been described with preferred embodiments, various modifications and adaptations thereof may be resorted to without departing from the spirit and scope of the invention as those skilled in the art will readily understand.

We claim:

1. An organic composition selected from the group consisting of lubricants and normally liquid hydrocarbon fuels, susceptible of permitting corrosive deterioration, containing in an amount sufficient to inhibit said deterioration, a salt obtained by reacting an imidazoline selected from the group consisting of dodecenyl imidazoline and heptadecenyl imidazoline or a diamine selected from the group consisting of 3-aminomethyl-3,5,5-trimethylcyclohexylamine, N-hepta-decyl-1,3-propanediamine, ethylene 3. A composition as defined in claim 1 wherein said salt is present in an amount from about 0.1 to about 5%, by weight.

4. A composition as defined in claim 1 wherein said imidazoline or said diamine are reacted with said acid in an equivalent weight ratio of from about 30:1 to about 0.1:1.

5. A composition as defined in claim 1 wherein said imidazoline or said diamine are reacted with said acid in an equivalent weight ratio of from about 15:1 to about 0.3:1.

6. A composition as defined in claim 1 wherein said acid is n-octylthioacetic acid.

7. A composition as defined in claim 1 wherein said acid is nonyl-phenoxy-acetic acid.

References Cited

UNITED STATES PATENTS

| | | | |
|---|---|---|---|
| 2,907,646 | 10/1959 | O'Kelly et al. | 44—63 |
| 2,919,979 | 1/1960 | Martin et al. | 44—63 |
| 3,108,963 | 10/1963 | Benge et al. | 252—51.5 A X |
| 3,116,252 | 12/1963 | Beretvas | 252—392 X |
| 3,314,968 | 4/1967 | Wakeman et al. | 252—33.6 X |
| 3,337,472 | 8/1967 | Littler et al. | 252—392 |

FOREIGN PATENTS

| | | | |
|---|---|---|---|
| 849,126 | 9/1960 | Great Britain | 252—33.6 |

DANIEL E. WYMAN, Primary Examiner

A. H. METZ, Assistant Examiner

U.S. Cl. X.R.

44—63; 252—34, 51.5 A, 391, 392

PO-1050
(5/69)

UNITED STATES PATENT OFFICE
CERTIFICATE OF CORRECTION

Patent No. 3,775,320          Dated November 27, 1973

Inventor(s) MARIO VIGO and FRITZ A. BUEHLER

It is certified that error appears in the above-identified patent and that said Letters Patent are hereby corrected as shown below:

Column 1, line 5, "Portici" should read --Naples--.

Signed and sealed this 23rd day of April 1974.

(SEAL)
Attest:

EDWARD M.FLETCHER,JR.
Attesting Officer

C. MARSHALL DANN
Commissioner of Patents